United States Patent
Mack (10) Patent No.: US 12,486,149 B2
(45) Date of Patent: Dec. 2, 2025

(54) ADJUSTABLE TIRE LIFT

(71) Applicant: Stacey W. Mack, Hanover, PA (US)

(72) Inventor: Stacey W. Mack, Hanover, PA (US)

(*) Notice: Subject to any disclaimer, the term of this patent is extended or adjusted under 35 U.S.C. 154(b) by 280 days.

(21) Appl. No.: 18/125,980

(22) Filed: Mar. 24, 2023

(65) Prior Publication Data

US 2024/0317553 A1    Sep. 26, 2024

(51) Int. Cl.
*B66F 7/28* (2006.01)
*A47F 7/04* (2006.01)

(52) U.S. Cl.
CPC . *B66F 7/28* (2013.01); *A47F 7/04* (2013.01)

(58) Field of Classification Search
CPC .... B66F 7/28; B66F 9/07504; B66F 9/07563; A47F 7/04
USPC .......... 211/24, 23, 27; 187/203; 248/346.01, 248/346.03, 346.07, 346.05, 346.06, 670, 248/674, 676, 677, 678, 645
See application file for complete search history.

(56) References Cited

U.S. PATENT DOCUMENTS

| | | | | | |
|---|---|---|---|---|---|
| 1,072,526 | A | * | 9/1913 | Stiles | A47C 3/021 248/670 |
| 2,815,128 | A | * | 12/1957 | Kauffman | B29D 30/68 248/176.1 |
| 3,410,122 | A | * | 11/1968 | Moses | E05B 73/0082 248/553 |
| 3,503,577 | A | * | 3/1970 | Martin | F16M 7/00 248/346.07 |
| 3,557,966 | A | * | 1/1971 | Skubic | A47B 81/007 211/24 |
| 3,812,974 | A | * | 5/1974 | Sylvester | A47F 7/04 211/23 |
| 4,079,604 | A | * | 3/1978 | Anderegg | B60R 11/0205 70/58 |
| 4,220,308 | A | * | 9/1980 | Strien | B60N 2/682 296/64 |
| 5,169,114 | A | * | 12/1992 | O'Neill | E05B 73/0082 248/680 |
| 5,556,064 | A | * | 9/1996 | Cowe | F16M 11/24 248/172 |
| 5,626,241 | A | * | 5/1997 | Holden | A47F 7/04 108/55.3 |
| 5,671,850 | A | * | 9/1997 | Basala | A47F 7/04 211/23 |
| 6,298,999 | B1 | * | 10/2001 | Bellman | A47F 7/04 211/49.1 |
| 7,021,599 | B2 | * | 4/2006 | DeGrazia | H01H 71/70 310/91 |
| 8,695,674 | B2 | * | 4/2014 | Kliskey | B60B 30/02 157/1 |
| 8,827,232 | B2 | * | 9/2014 | Crowley | A47B 43/003 248/676 |
| 9,022,337 | B2 | * | 5/2015 | Petruskavich | A47F 7/0042 248/176.1 |

(Continued)

*Primary Examiner* — Jennifer E. Novosad
(74) *Attorney, Agent, or Firm* — Barley Snyder (57) ABSTRACT

An adjustable tire lift assembly comprising a tire receiver assembly. The tire receiver assembly having a platform. The adjustable tire lift assembly having an adjustment assembly. The adjustment assembly having a pair of structural beams. The adjustment assembly further having a pair of stabilizers positioned parallel to each structural beam. The adjustment assembly further having an outside adjustment assembly. The adjustment assembly further having a plurality of support bars.

20 Claims, 13 Drawing Sheets

(56) References Cited

U.S. PATENT DOCUMENTS

| | | | | |
|---|---|---|---|---|
| 9,902,599 | B1* | 2/2018 | Veresko | B66F 7/10 |
| 10,407,087 | B1* | 9/2019 | Baker | B62B 3/005 |
| 11,097,798 | B1* | 8/2021 | McDowell | A47F 5/16 |
| 11,440,779 | B2* | 9/2022 | Ringler | B66F 7/10 |
| 12,054,374 | B1* | 8/2024 | Dongmei | B66F 7/02 |
| 12,145,825 | B2* | 11/2024 | Mack | B66D 1/28 |
| 2012/0018255 | A1* | 1/2012 | Gross | B66F 7/28 |
| | | | | 187/203 |
| 2015/0096947 | A1* | 4/2015 | Shaw | A47F 7/04 |
| | | | | 211/23 |
| 2016/0144745 | A1* | 5/2016 | Saucier | B60N 2/02246 |
| | | | | 248/645 |
| 2023/0174355 | A1* | 6/2023 | Koehler | B66F 7/04 |
| | | | | 187/203 |
| 2024/0317552 | A1* | 9/2024 | Mack | B60B 33/0018 |
| 2024/0317553 | A1* | 9/2024 | Mack | A47F 7/04 |
| 2024/0317554 | A1* | 9/2024 | Mack | B66F 7/28 |
| 2025/0048965 | A1* | 2/2025 | Füchtling | A01D 41/145 |

* cited by examiner

ADJUSTABLE TIRE LIFT

FIELD OF THE INVENTION

The present invention relates to a tire lift and, more particularly, to an adjustable tire lift, attachable to an existing beam of an automobile lift.

BACKGROUND

As a general matter, tire transportation assemblies are currently available. However, the tire transportation assemblies that are currently disclosed lack the adaptability and mobility for attaching the tire lift to different dimensional configurations of the beam of the automobile lift.

It is desirable to provide a tire transportation attachable that would adjust in height and width in order to be secured to different dimensional sized beams of an automobile lift.

As the foregoing illustrates, the invention provides the adjustable tire lift assembly.

SUMMARY

An adjustable tire lift assembly comprising a tire receiver assembly. The tire receiver assembly having a platform. The platform having a base portion and a plurality of fortifying walls. The adjustable tire lift assembly having an adjustment assembly. The adjustment assembly having a pair of structural beams. The pair of structural beams having an inside height modifier positioned within each structural beam of the pair of structural beams. The pair of structural beams further having a coupler positioned adjacent the inside height modifier. The adjustment assembly further having a pair of stabilizers positioned parallel to each structural beam. The adjustment assembly further having an outside adjustment assembly. The outside adjustment assembly having an outside adjustment modifier positioned at a far end of each stabilizer of the pair of stabilizers. The outside adjustment modifier having an outside height modifier positioned on a face of the outside adjustment modifier. The outside adjustment modifier further having an outside extension modifier positioned on an opposite face from the outside height modifier. The outside adjustment assembly further having a coupler fastened to the outside height modifier. The adjustment assembly further having a plurality of support bars. The plurality of support bars having a pair of end bars. The plurality of support bars further having a pair of cross bars coupled to the pair of end bars. The plurality of support bars further having a plurality of tires positioned above the pair of cross bars.

BRIEF DESCRIPTION OF DRAWINGS

In the following, the present invention is described in more detail with references to the drawings in which.

DETAILED DESCRIPTION OF THE EMBODIMENTS

Figure 1:
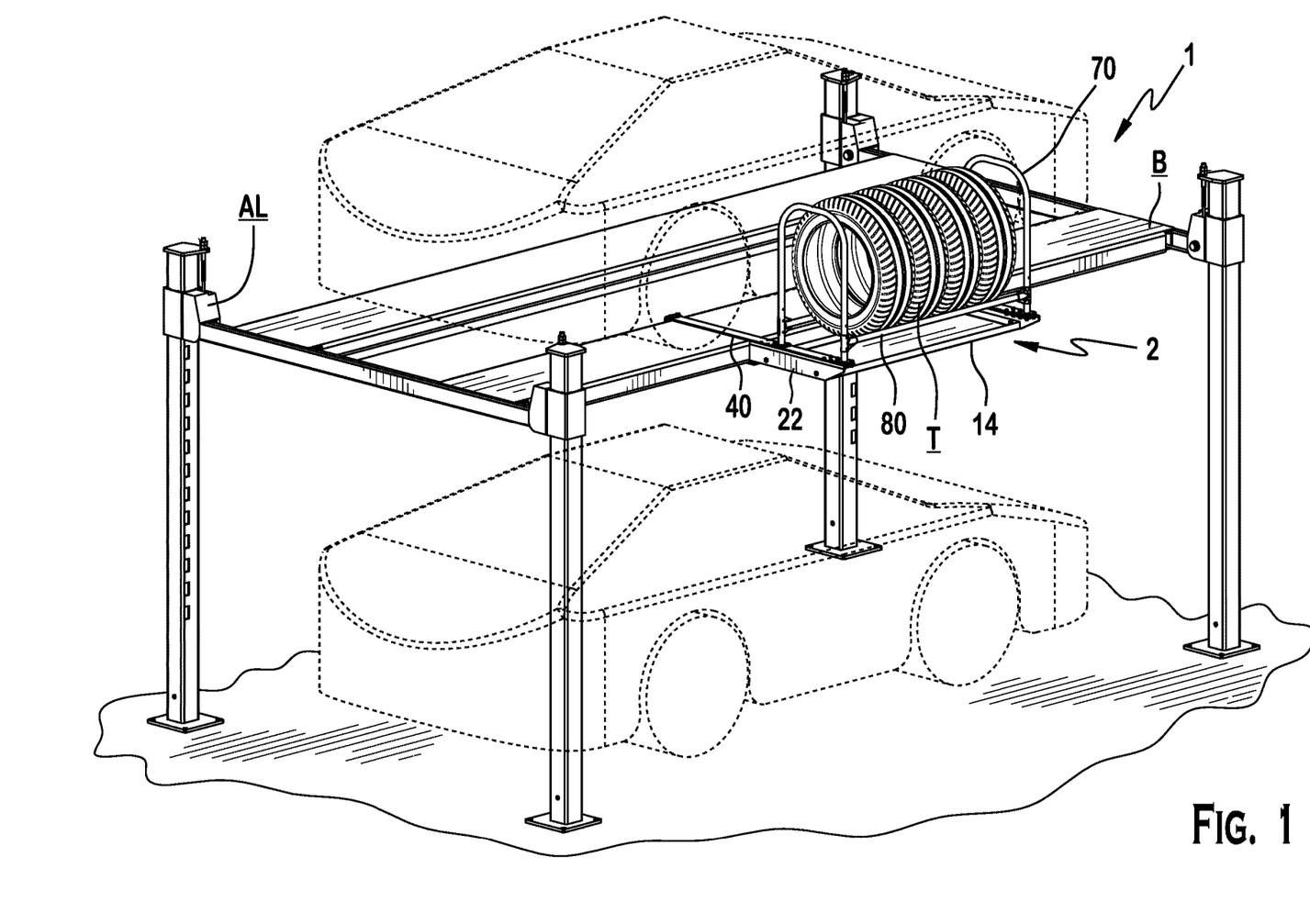
FIG. 1 illustrates the adjustable tire lift assembly, as assembled.
Figure 2:
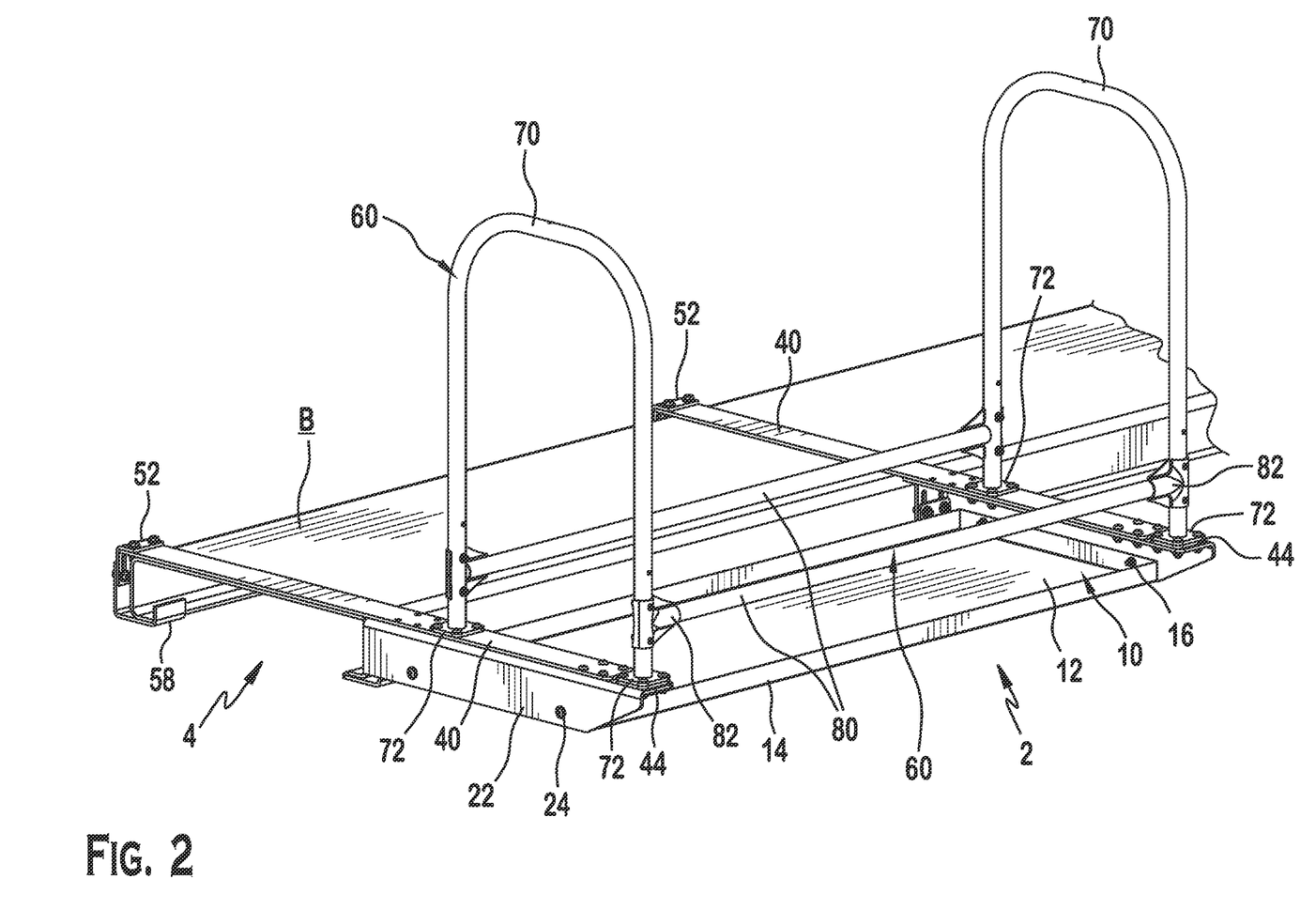
FIG. 2 illustrates a top, rear, left side view of FIG. 1.
Figure 3:
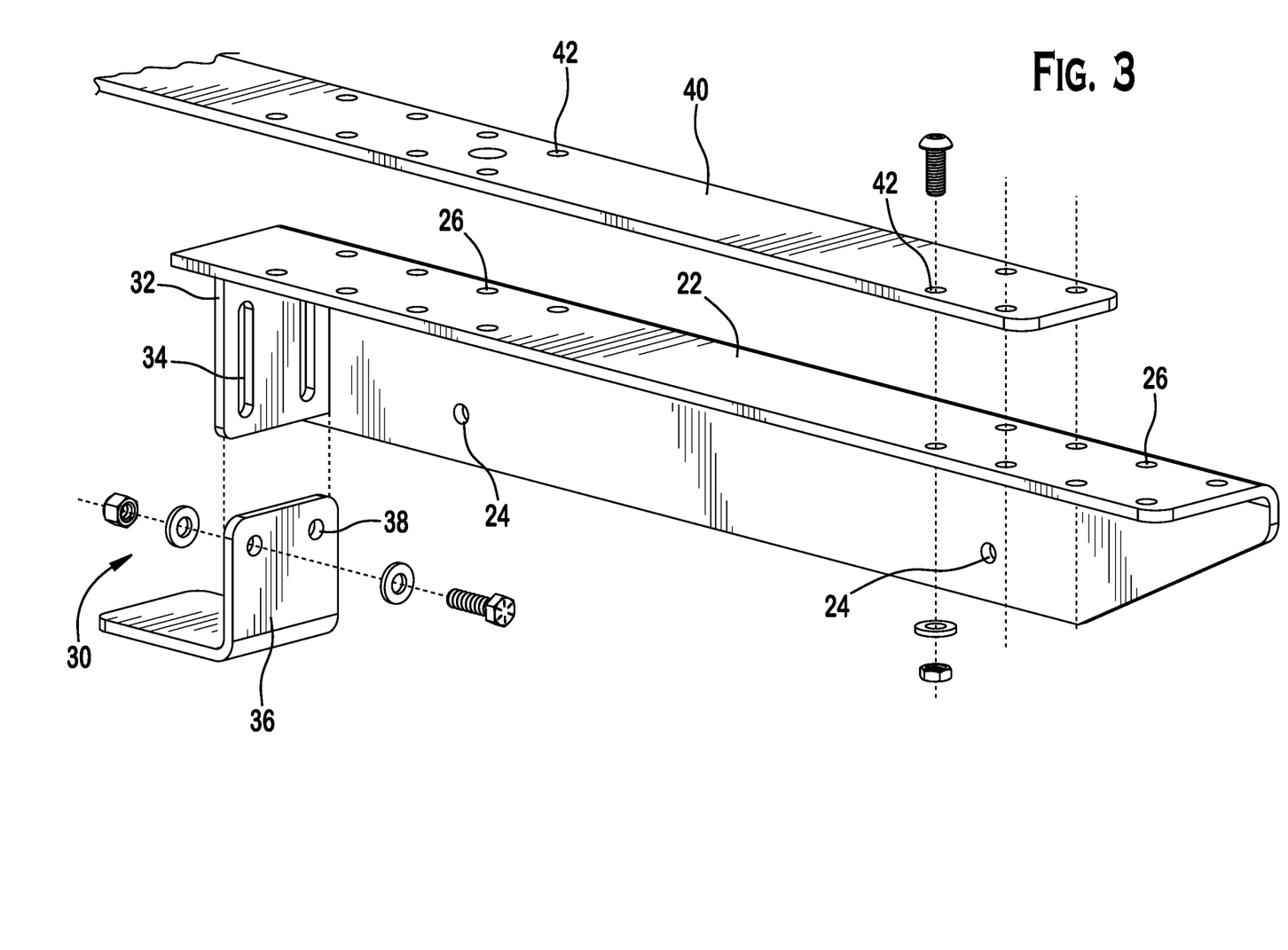
FIG. 3 illustrates an exploded view of FIG. 2.
Figure 4:
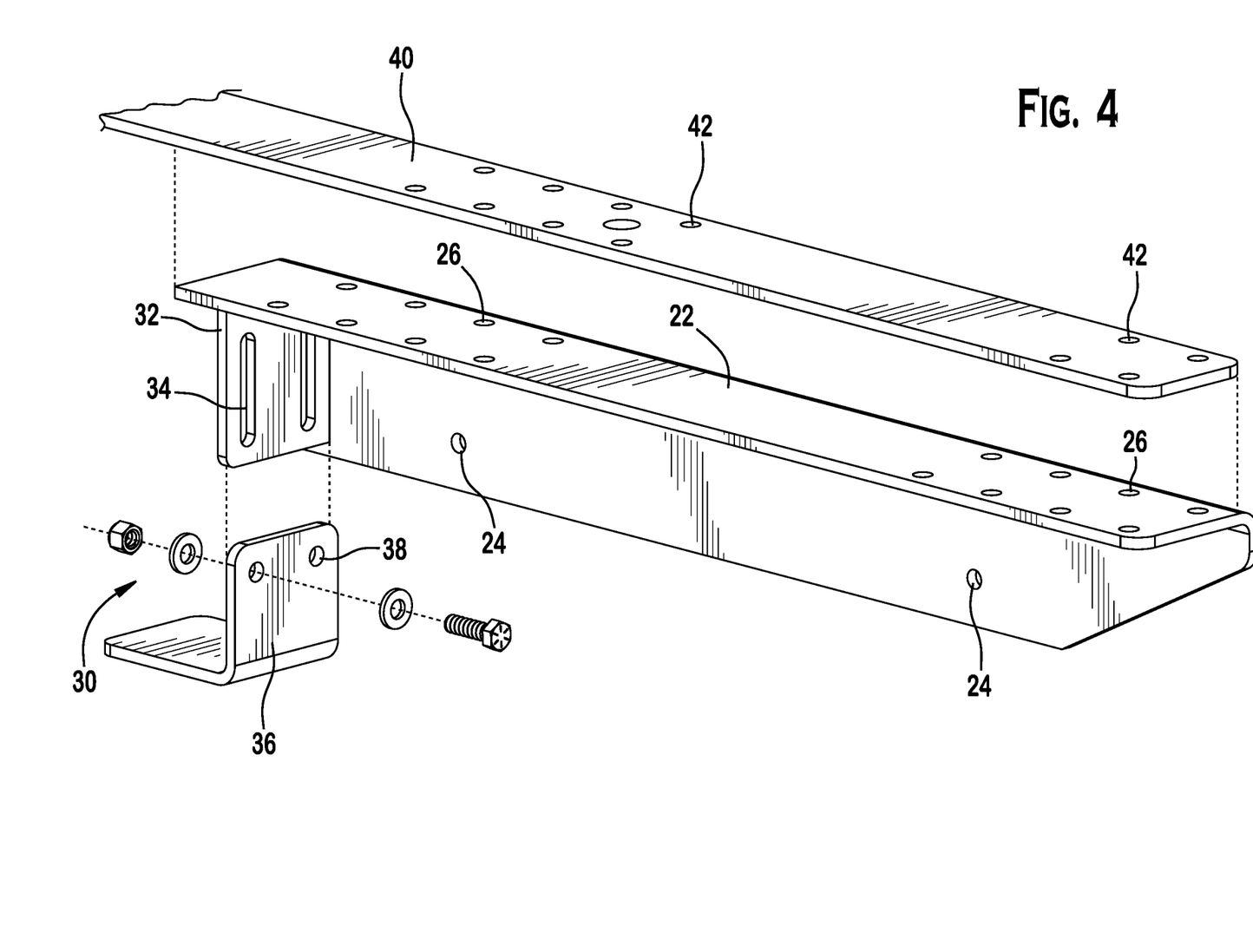
FIG. 4 illustrates another exploded view of FIG. 3.
Figure 5:
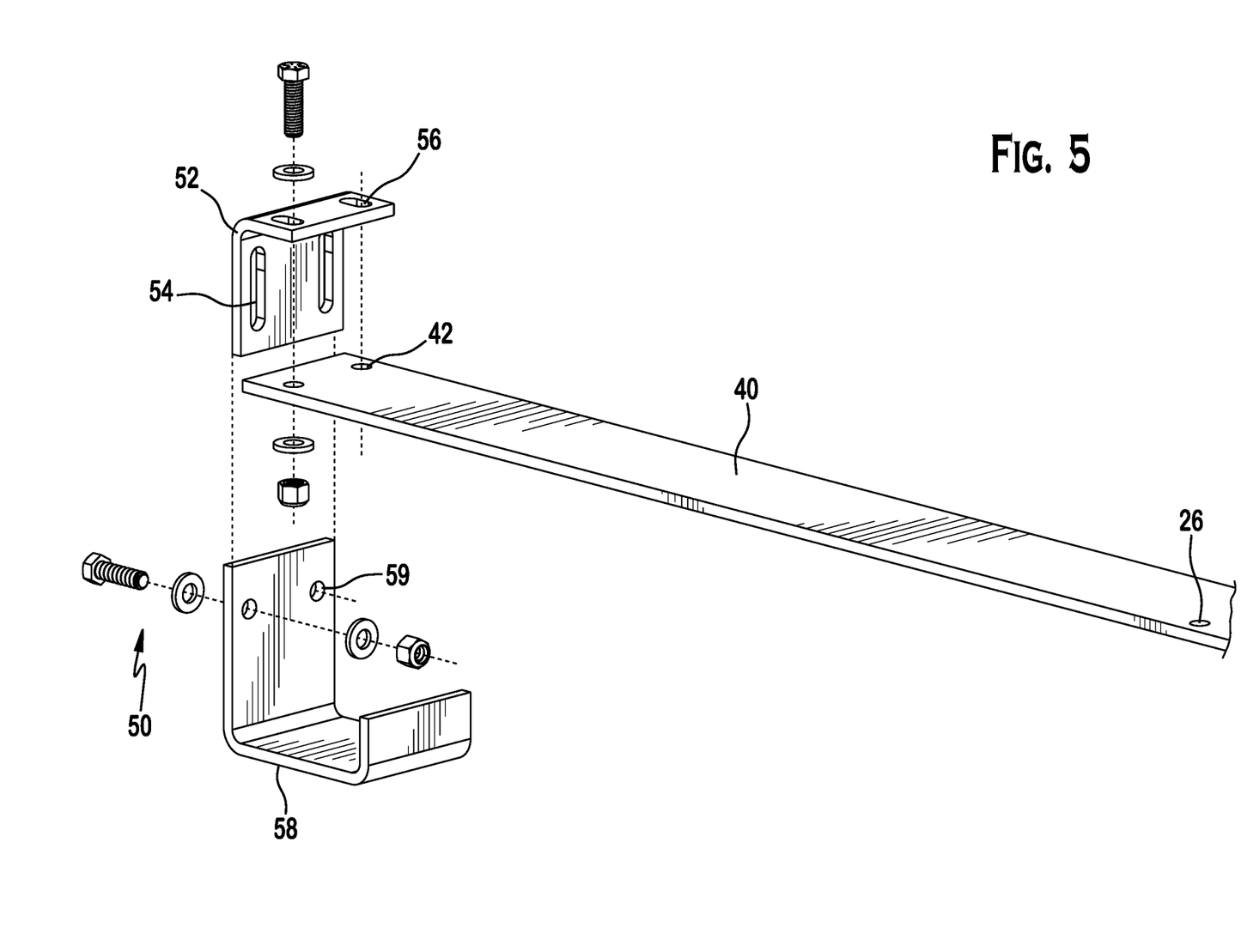
FIG. 5 illustrates another exploded view of FIG. 4.
Figure 6:
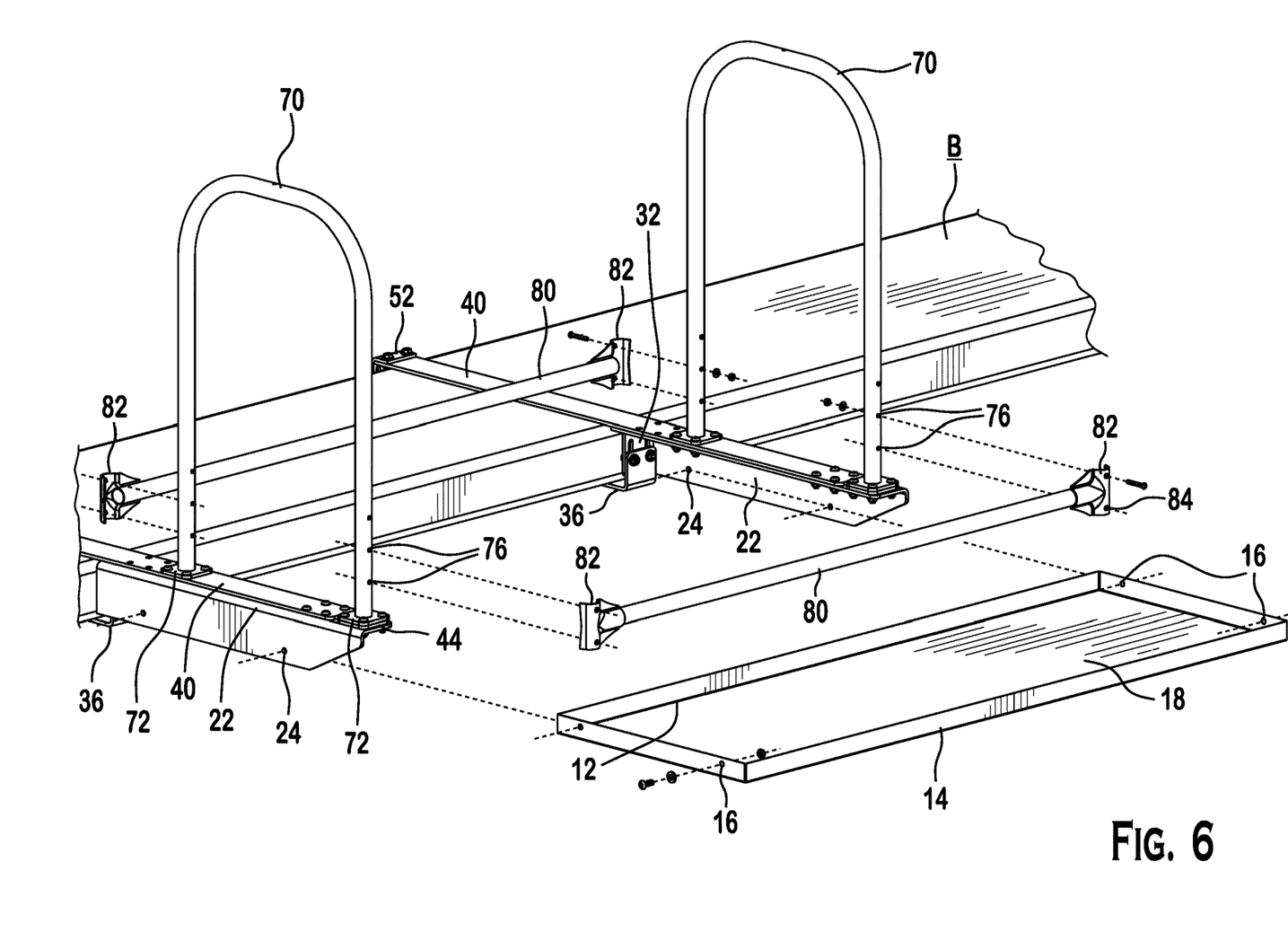
FIG. 6 illustrates another exploded view of FIG. 5.
Figure 7:
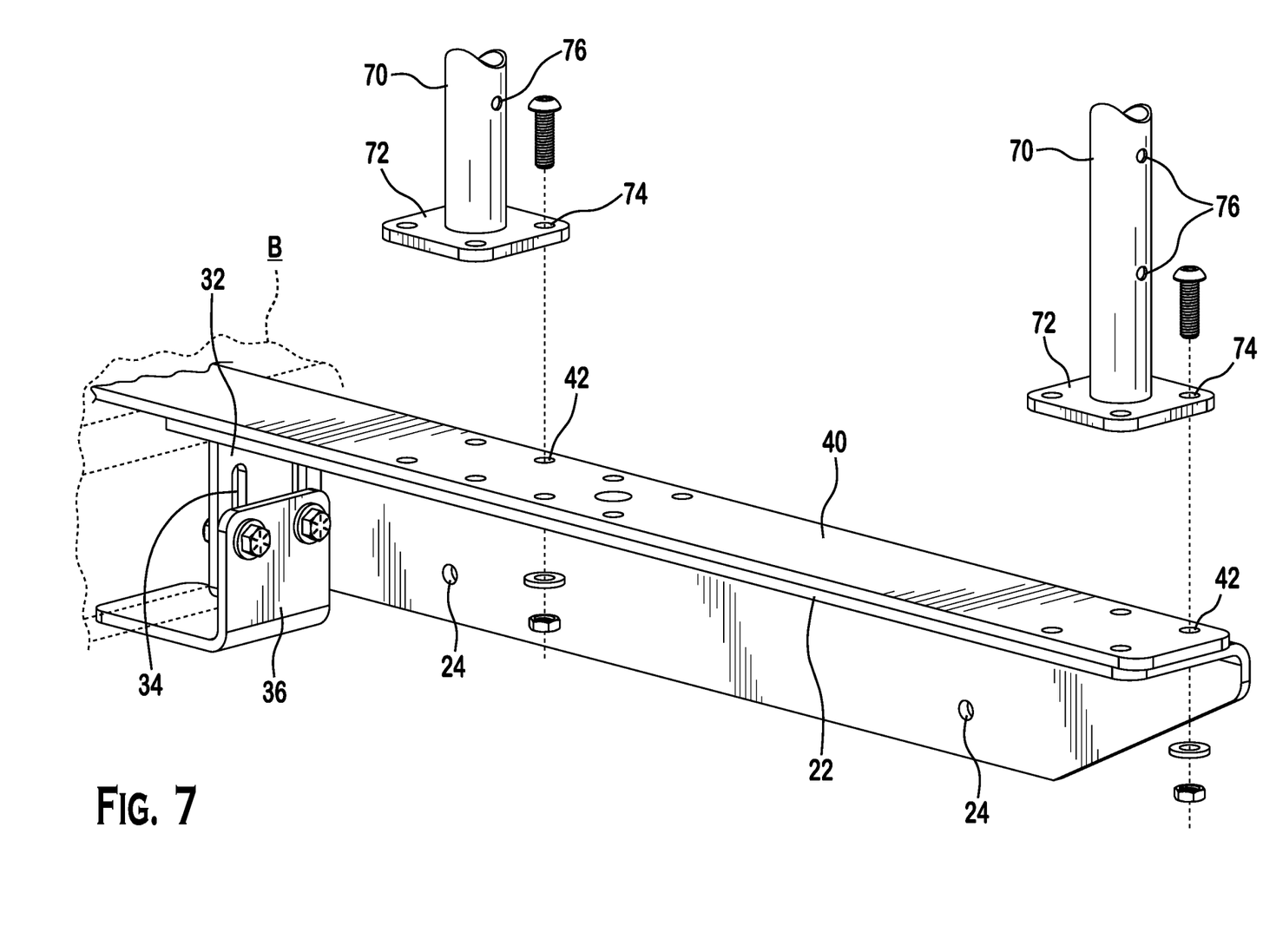
FIG. 7 illustrates another exploded view of FIG. 6.
Figure 8:
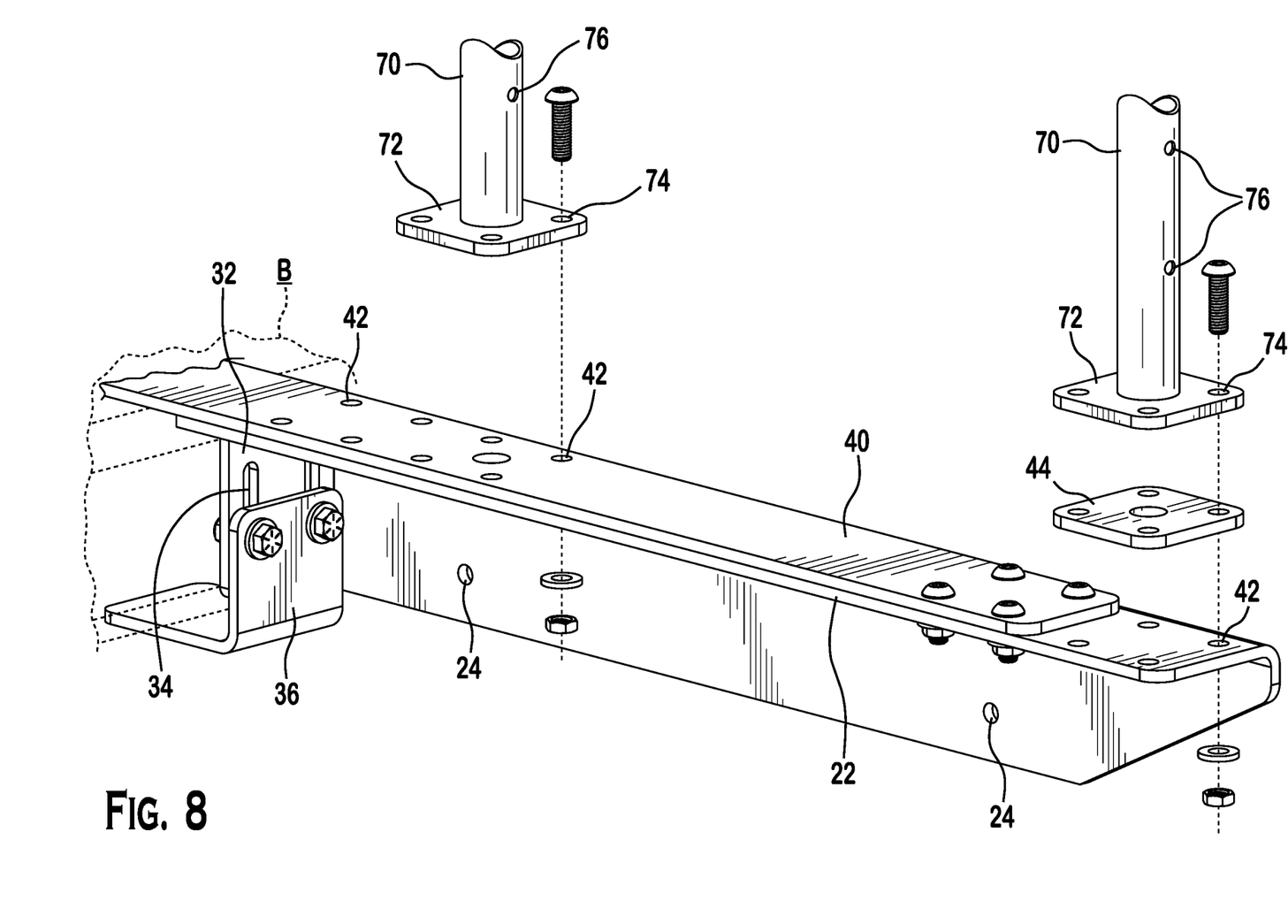
FIG. 8 illustrates another embodiment of the invention.
Figure 9:
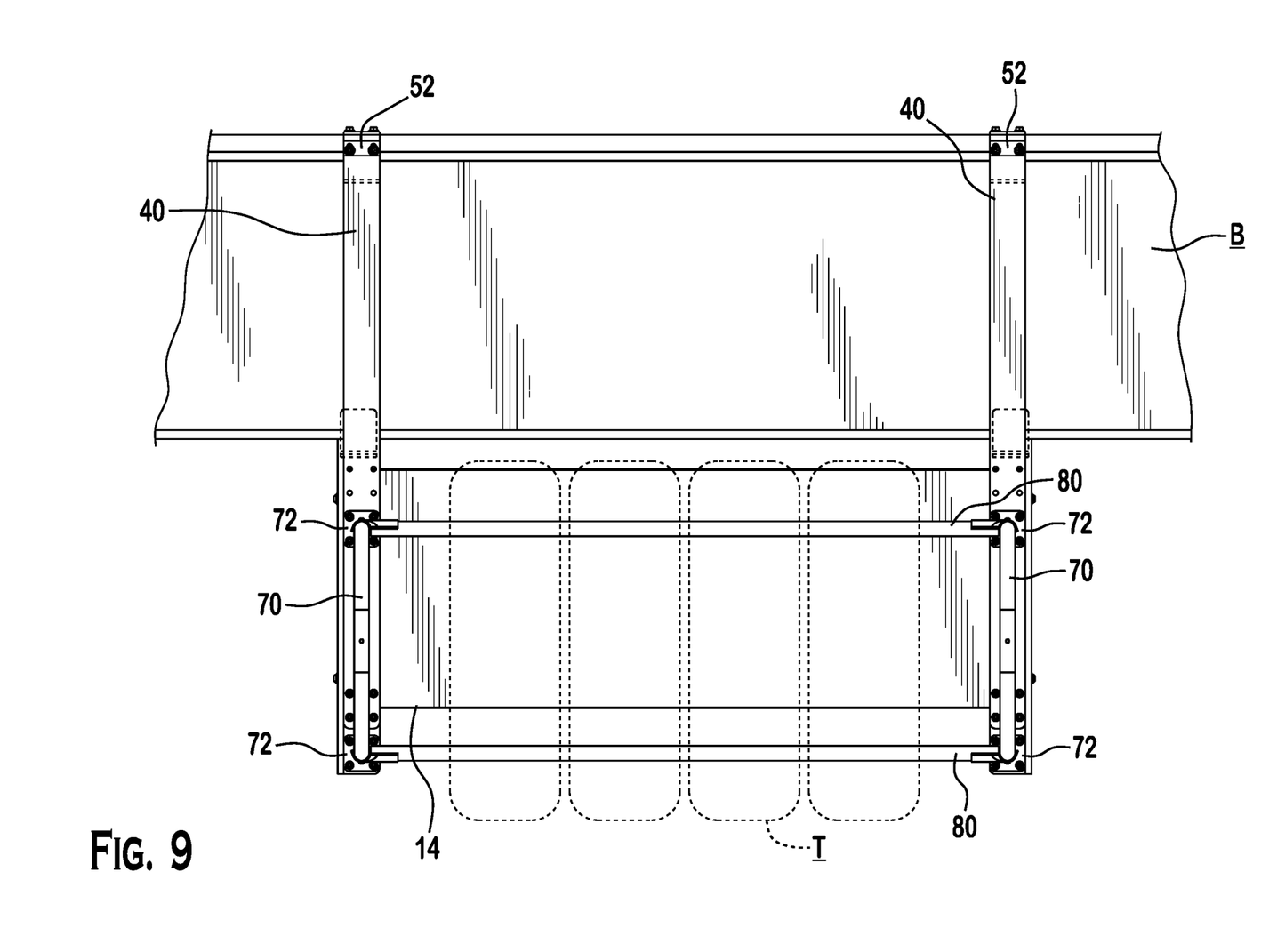
FIG. 9 illustrates another top view of FIG. 8.
Figure 10:
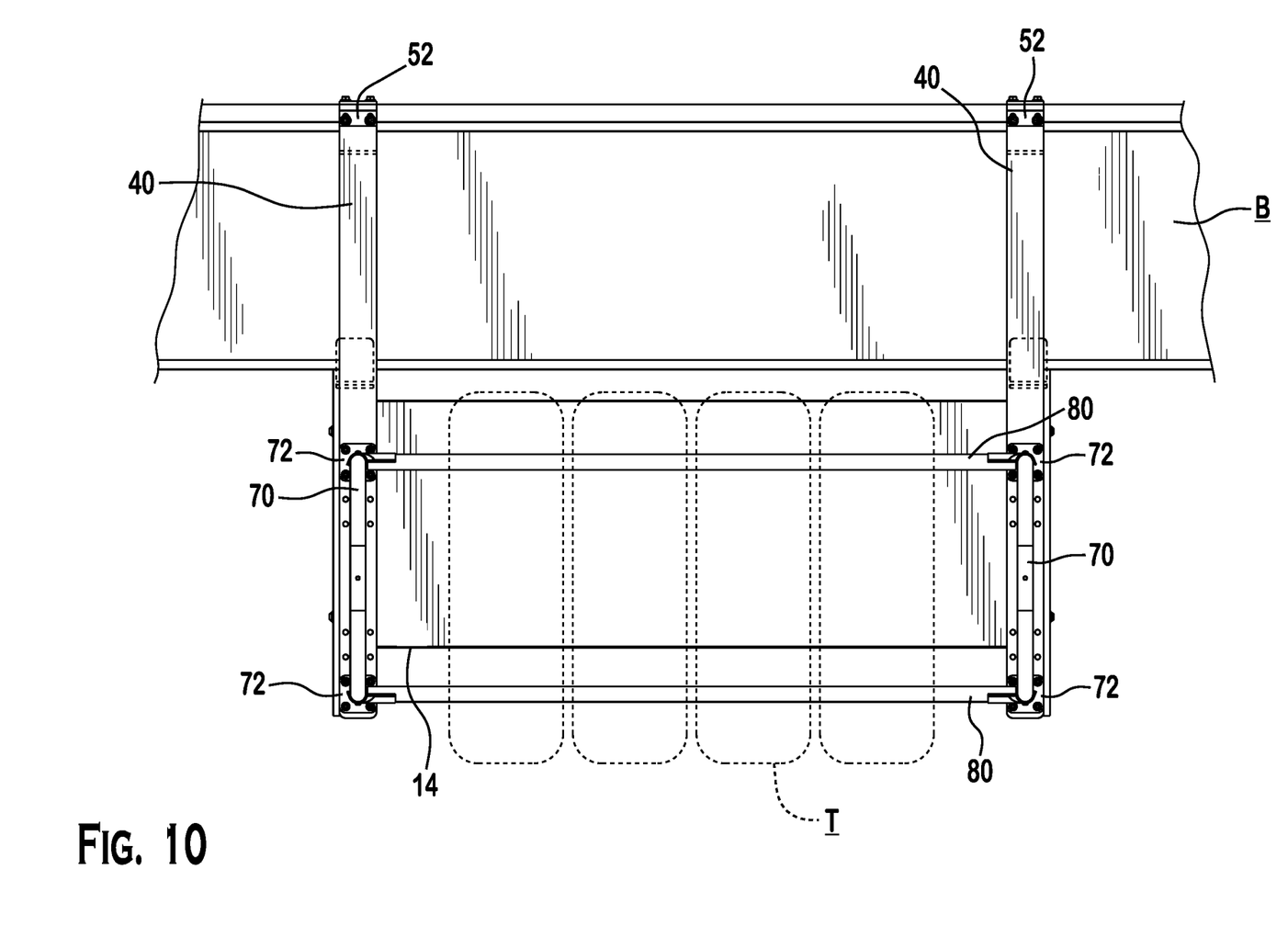
FIG. 10 illustrates another embodiment of the invention.
Figure 11:
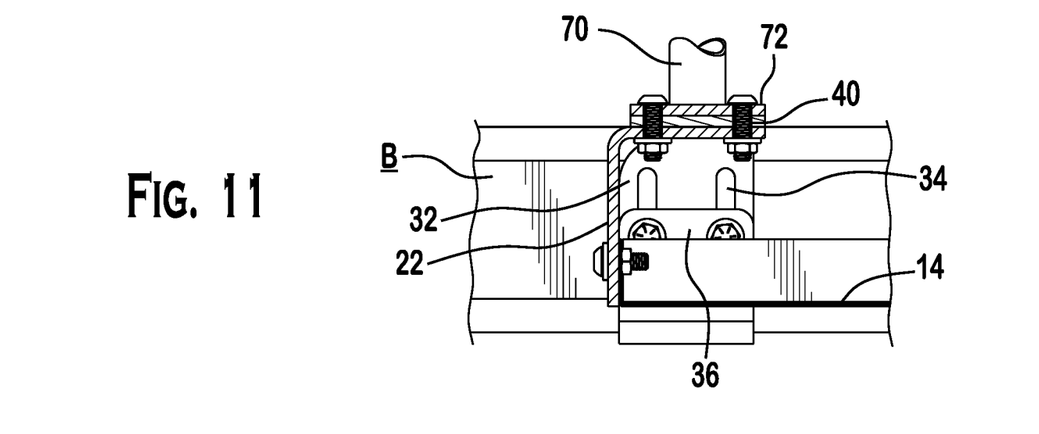
FIG. 11 illustrates another cross sectional view of FIG. 10.
Figure 12:
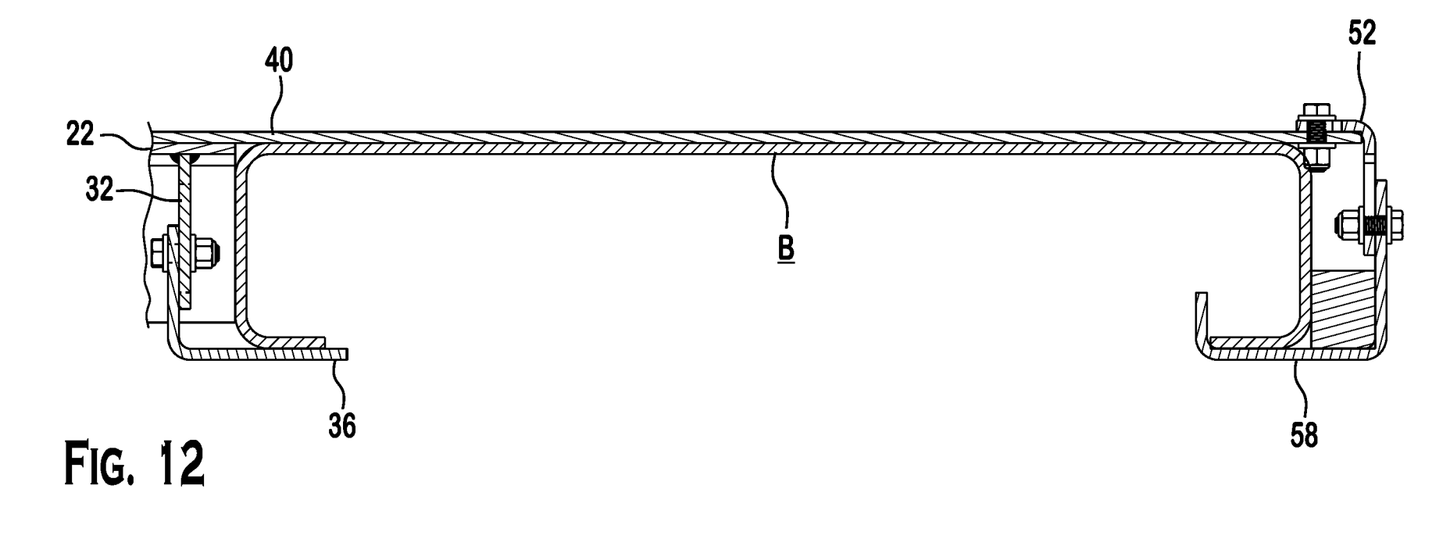
FIG. 12 illustrates another cross sectional view of FIG. 11.
Figure 13:
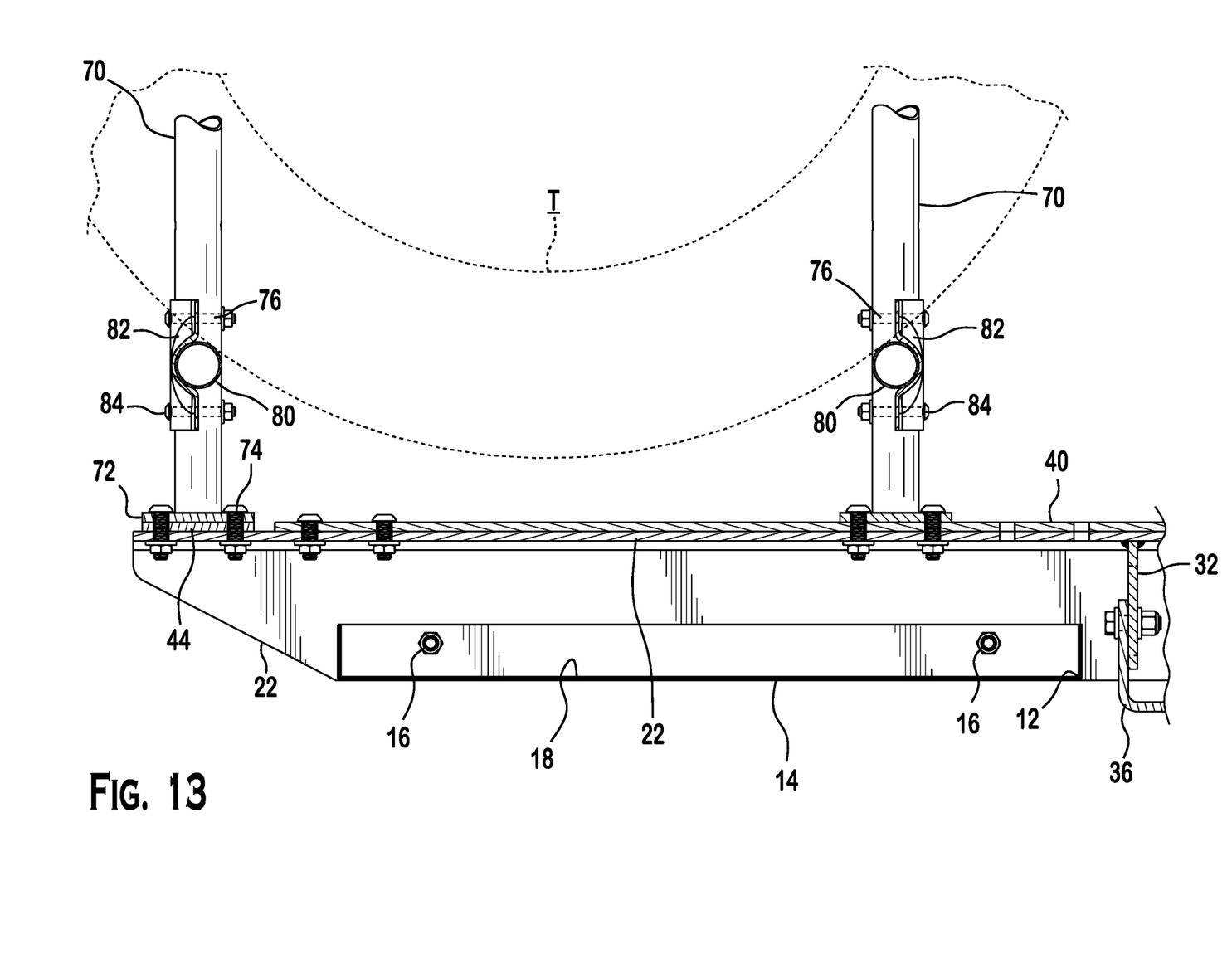
FIG. 13 illustrates another embodiment of the invention.
Figure 14:
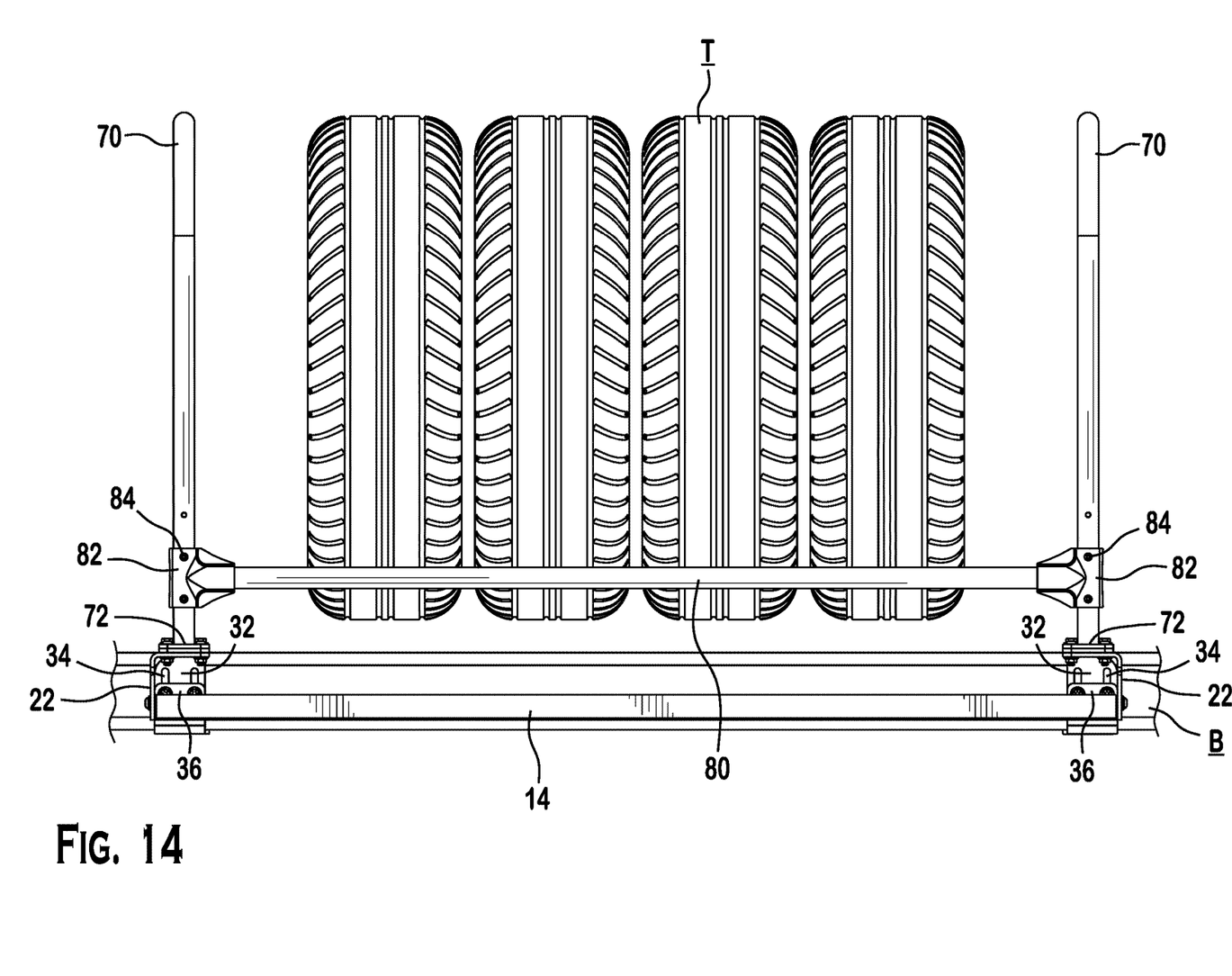
FIG. 14 illustrates another embodiment of the invention.

The present disclosure includes a tire lift assembly 1 according to the invention. In the exemplary embodiment, the tire lift assembly 1 includes a tire receiver assembly 2 and an adjustment assembly 4.

In the exemplary embodiment, tire lift assembly 1 generally has a platform 10.

In the exemplary embodiment, the platform 10 includes a base portion 12. One skilled in the art would understand the applicant's design is not the exclusive embodiment.

As illustrated, the base portion 12 is an elongated member. The base portion further includes a plurality of fortifying walls 14. One of ordinary skill in the art would understand the applicant's design is not the exclusive embodiment. The plurality of fortifying walls 14 further includes a pair of receiving passageways 16. The base portion 12 further forms a material cradle 18 within the fortifying walls. 14 One skilled in the art would understand the applicant's design is not the exclusive embodiment.

As illustrated, the adjustment assembly 4 includes a plurality of supports 20. The plurality of supports 20 include a pair of structural beams 22. The pair of structural beams 22 are elongated V-shaped members. Each of the structural beams 22 further include a pair of connector passageways 24. Each of the structural beams 22 further includes a plurality of receiving passageways 26 positioned on an upper portion of each structural beam 22.

As shown, each of the structural beams 22 further include an inside adjustment assembly 30.

The inside adjustment assembly 30 includes an inside height modifier 32. The inside height modifier 32 is a plate like member positioned perpendicular and within each of the structural beams 22. The inside height modifier 32 further includes a slot 34 located in the central region of the inside height modifier 32.

The inside adjustment assembly 30 further includes a coupler 36 positioned adjacent the inside height modifier 32 and within the structural beam 22. The coupler 36 is a hinge member. The coupler 36 further includes a pair of passageways 38 extending therethrough.

In the exemplary embodiment, the plurality of supports 20 further include a pair of stabilizers 40, an outside adjustment assembly 50, and a plurality of support bars 60.

As illustrated, each stabilizer 40 of the pair of stabilizers 40 is an elongated sheet member. Each stabilizer 40 includes a plurality of stabilizing connectors 42 as illustrated. Each stabilizer 40 further includes a spacer plate 44. The spacer plate 44 is positioned adjacent the stabilizer 40 in order to fill a void when mounted to a wider car lift beam B.

As illustrated, the outside adjustment assembly 50 includes an outside adjustment modifier 52. The outside adjustment modifier 52 is hinge shaped. The outside adjustment modifier 52 includes an outside height modifier 54. The outside height modifier 54 is a slot member positioned on one face of the outside adjustment modifier 52. Each outside adjustment modifier 52 further includes an outside extension modifier 56. The outside extension modifier 56 is a slot member positioned on an opposite face from the outside height modifier 54 or a second face of the outside adjustment modifier 52.

As illustrated, the outside adjustment assembly 50 further includes a coupler 58. The coupler is a J-shaped member. The coupler 58 further includes a plurality of passageways 59.

In the exemplary embodiment, the plurality of support bars 60 include a pair of end bars 70 and a pair of cross bars 80.

As shown, each end bar 70 of the pair of end bars 70 are curved members. Each end bar 70 includes a mounting bracket 72 positioned at each end thereof. Each mounting bracket 72 includes a plurality of fastener receiving passageways 74. Each end bar 70 further includes a plurality of bar receiving passageways 76.

As illustrated, each cross bar 80 of the pair of cross bars 80 are tubular members. Each cross bar 80 further includes a bar coupler 82. The bar coupler 82 further includes connector passageways 84. One of ordinary skill in the art would understand the applicant's design is not the exclusive embodiment.

As assembled, the plurality of fortifying walls 14 surround the base portion 12. The pair of structural beams 22 are positioned at opposite ends of the base portion 12 and outside the plurality of fortifying walls 14. Each structural beam 22 is fastened to one of the fortifying walls 14 by a fastener running through the receiving passageway 16 and the connector passageways 24. The inside height modifier 32 is positioned perpendicular and within each structural beam 22. The coupler 36 is adjacent and fastened to the inside height modifier 32 by positioning a fastener through the pair of passageways 38 and the slot 34. The coupler 36 is then flush with the car lift beam B.

Each stabilizer 40 of the pair of stabilizers 40 are positioned above and parallel to each of the structural beams 22 and connected by the plurality of stabilizing connectors 42. On an opposing end of each stabilizer 40, the outside adjustment modifier 52 at a far end of each stabilizer 40 is fastened by a connector positioned through the outside extension modifier 56 and the stabilizing connectors 42. The coupler 58 is positioned under the stabilizer 40 and fastened to the outside height modifier 54 by running a fastener through the plurality of passageways 59. The coupler 58 then becomes flush and locks with the car lift beam B.

As shown, each end bar 70 is positioned on each stabilizer 40 by the mounting bracket 72 coupling to the stabilizer 40. Alternatively, one of the end bars 70 is positioned on the spacer plate 44 which mounts directly on the structural beam 22. Each cross bar 80 is coupled to each end bar 70 by aligning the bar coupler 82 and running a fastener through the connector passageway 84 and plurality of bar receiving passageways 76.

Each stabilizer 40 can adjust between 20" to 24"+/−1/16". In another embodiment, each stabilizer 40 can adjust between 20" to 24"+/−0.03". In another embodiment, each stabilizer 40 can adjust between 20" to 24"+/−0.015". In another embodiment, each stabilizer 40 can adjust between 20" to 24"+/−0.0005".

A height of the tire lift assembly 1 is about 36"+/−1/16". In another embodiment, a height of the tire lift assembly 1 is about 36"+/−0.03". In another embodiment, a height of the tire lift assembly 1 is about 36"+/−0.015". In another embodiment, a height of the tire lift assembly 1 is about 36"+/−0.0005".

A length of the tire lift assembly 1 is about 48"+/−1/16". In another embodiment, a length of the tire lift assembly 1 is about 48"+/−0.03". In another embodiment, a length of the tire lift assembly 1 is about 48"+/−0.015". In another embodiment, a length of the tire lift assembly 1 is about 48"+/−0.0005".

In the exemplary embodiment, an operator may remove the tire lift assembly 1 from the beam B on one automobile lift AL and position the tire lift assembly 1 on a different dimensional configuration beam B of a different automobile lift AL. The operator may adjust the length and height of each stabilizer 40 to adapt to the beam B by the inside adjustment assembly 30 and the outside adjustment assembly 50.

In the exemplary embodiment, the operator increases and decreases the length of the stabilizer 40 by adjusting the fastener positioned in the outside extension modifier 56. The operator would adjust the fastener in a forward position in order to decrease the length of the stabilizer 40. The operator would adjust the fastener in a rear position in order to increase the length of the stabilizer 40.

In the exemplary embodiment, the operator increases and decreases the height of the stabilizer 40 by adjusting the fasteners positioned in both the inside height modifier 32 and the outside height modifier 54. The operator would adjust the fastener in an upwards position in order to increase the height of stabilizer 40. The operator would adjust the fastener in a downwards position in order to decrease the height of the stabilizer 40.

As illustrated, a plurality of tires T are positioned above the pair of cross bars 80. Specifically, four 12.5" tires would be positioned on the pair of cross bars 80. Additionally, the operator may place their materials or tools in the material cradle 18.

It should be noted that various changes and modifications to the embodiments described herein will be apparent to those skilled in the art. Such changes and modifications may be made without departing from the spirit and scope of the present invention and without diminishing its intended advantages. For example, various embodiments of the assembly and methods may be provided based on various combinations of the features and functions from the subject matter provided herein.

What is claimed is:

1. An adjustable tire lift assembly comprising:
   a tire receiver assembly having:
      a platform having:
         a base portion; and
         a plurality of fortifying walls;
      an adjustment assembly adjacent to the platform and having:
         a pair of structural beams having:
            an inside height modifier positioned within each structural beam of the pair of structural beams;
            a coupler positioned adjacent the inside height modifier; and
         a pair of stabilizers positioned parallel to each structural beam; and
         an outside adjustment assembly having:
            an outside adjustment modifier positioned at a distal end of each stabilizer of the pair of stabilizers having:
               an outside height modifier positioned on a face of the outside adjustment modifier;
               an outside extension modifier positioned on an opposite face from the outside height modifier;
            a coupler fastened to the outside height modifier; and
         a plurality of support bars adjacent to the platform and the adjustment assembly and having:

a pair of end bars;
a pair of cross bars coupled to the pair of end bars; and a plurality of tires positioned above the pair of cross bars.

2. The adjustable tire lift assembly of claim 1, wherein a length of each stabilizer is adjustable by adjusting the outside extension modifier.

3. The adjustable tire lift assembly of claim 2, wherein a height of each stabilizer is adjustable by adjusting the inside height modifier.

4. The adjustable tire lift assembly of claim 3, wherein the height of each stabilizer is adjustable by adjusting the outside height modifier.

5. The adjustable tire lift assembly of claim 4, wherein the inside height modifier is positioned perpendicular to each structural beam.

6. The adjustable tire lift assembly of claim 5, wherein the inside height modifier includes a slot.

7. The adjustable tire lift assembly of claim 6, wherein the coupler adjacent the inside height modifier is fastened to the coupler by the slot.

8. The adjustable tire lift assembly of claim 7, wherein the coupler adjacent the inside height modifier is adapted to be flush with a beam of an automobile lift.

9. The adjustable tire lift assembly of claim 8, wherein the coupler of the outside adjustment assembly is fastened to the outside height modifier.

10. The adjustable tire lift assembly of claim 9, wherein the coupler of the outside adjustment assembly is adapted to be flush with the beam of the automobile lift.

11. The adjustable tire lift assembly of claim 10, wherein the platform further includes a material cradle.

12. The adjustable tire lift assembly of claim 11, wherein the adjustment assembly further includes a spacer plate.

13. The adjustable tire lift assembly of claim 12, wherein each of the pair of end bars includes a mounting bracket positioned at each end thereof.

14. The adjustable tire lift assembly of claim 13, wherein each cross bar of the pair of cross bars includes a bar coupler.

15. The adjustable tire lift assembly of claim 14, wherein the plurality of fortifying walls surrounds the base portion.

16. The adjustable tire lift assembly of claim 15, wherein the coupler of the outside adjustment assembly is positioned under each stabilizer.

17. The adjustable tire lift assembly of claim 16, wherein each end bar of the pair of end bars is coupled to each stabilizer of the pair of stabilizers.

18. The adjustable tire lift assembly of claim 17, wherein the spacer plate is positioned adjacent each stabilizer.

19. The adjustable tire lift assembly of claim 17, wherein the coupler of the outside adjustment assembly, is adapted to lock with the beam of the automobile lift.

20. The adjustable tire lift assembly of claim 1, wherein the pair of cross bars are coupled to the pair of end bars by a pair of bar couplers.

* * * * *